MODULATION TECHNIQUE EXHIBITING IMPROVED STABILIZATION AT HIGH CARRIER FREQUENCIES

Filed Nov. 27, 1964

INVENTOR
ADOLF H. BOTT
BY Edward J. Norton
Attorney

United States Patent Office 3,375,470
Patented Mar. 26, 1968

3,375,470
MODULATION TECHNIQUE EXHIBITING IMPROVED STABILIZATION AT HIGH CARRIER FREQUENCIES

Adolf H. Bott, McMurray, Pa., assignor to Radio Corporation of America, a corporation of Delaware
Filed Nov. 27, 1964, Ser. No. 414,171
6 Claims. (Cl. 332—45)

ABSTRACT OF THE DISCLOSURE

The improved stability modulation scheme at high carrier frequencies comprises effectively operating a triode mixer stage in the grounded grid mode for a driver frequency, which driver frequency differs from the modulated output carrier frequency by a relatively low transposing frequency, while at the same time operating the triode mixer as a grid modulator at the relatively low transposing frequency.

Figures 1, 2:
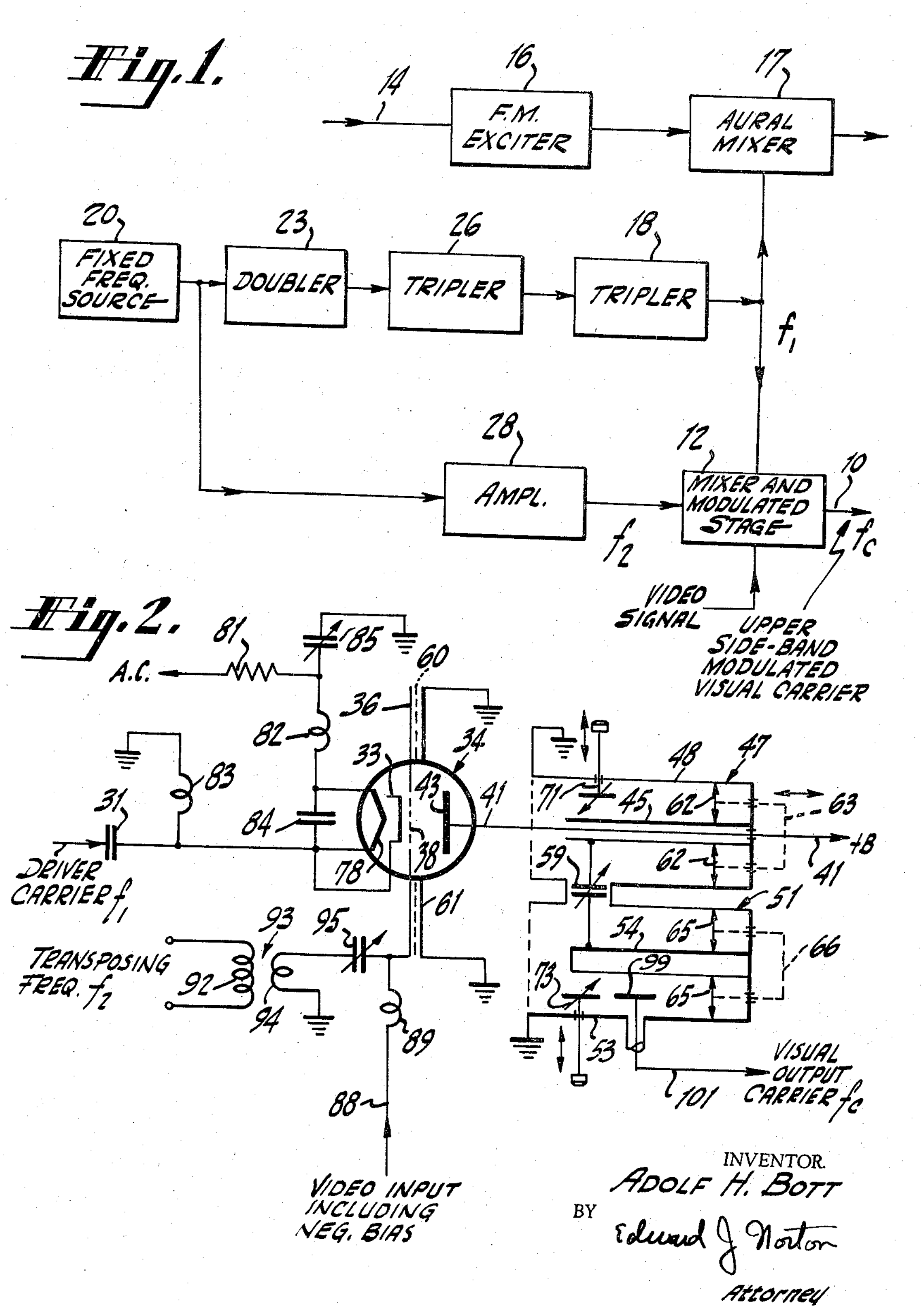

The present invention relates to amplitude modulation systems, and particularly to a novel system for producing modulation by modulating a mixer stage near the desired carrier frequency with a modulating signal while simultaneously transposing the carrier frequency to the desired frequency.

An object of the present invention is to provide a novel modulation system possessing the advantages of grid modulation combined with the stability of a grounded grid stage.

Another object of the present invention is to provide a novel modulation system having an output power level high enough to avoid the need for large amounts of following linear amplification.

A further object of the present invention is to provide a novel mixer-modulator stage which does not pass the driving frequency and therefore does not require modulation of the driver frequency.

A still further object of the present invention is to provide a novel modulation system having a mixer stage to which a driver frequency, a frequency selected to transpose the driver frequency to the desired carrier frequency and a modulating signal are applied.

In accordance with the present invention a mixer stage, resembling a grounded grid triode amplifier, serves as the modulator. The mixer stage comprising an electron device, for example a vacuum tube, has an unmodulated driver carrier of frequency $f_1$ applied to one electrode, for example the cathode in the illustrative example. The common electrode, in this case the grid, is suitably biased by a direct current (D.C.) voltage. The modulating frequency, a video signal for example, is applied to the common electrode. Also a signal of frequency $f_2$ is applied to the common electrode. The modulated carrier of the desired frequency $f_c$ for antenna radiation, or other purposes, is available at the output electrode, the plate in the illustrative example, and is recovered by a suitable filter. The frequency $f_c$ may be the sum of $f_1$ and $f_2$ modulated by the video signal. The modulated frequencies $f_1$, $f_2$ and their modulated difference frequency are also present. The filter provides a convenient means for shaping the selected output signal to vestigal sideband form by suppressing the unwanted sideband by about 20 db.

The invention will be described in greater detail by reference to the accompanying drawing in which:

FIGURE 1 is a schematic diagram in block form of a portion of a television transmitter embodying the modulation system of the present invention; and FIGURE 2 is a schematic diagram of one embodiment of the mixer and modulated stage of FIGURE 1.

Referring to FIGURE 1 of the drawing showing a portion of a television transmitter operating in the UHF band, it will be assumed, solely by way of example, that the transmitter is adjusted for television channel 50. The frequency of the visual carrier $f_c$ modulated with the video signal is 687.268 megacycles (mc.) and appears at the output 10 of the mixer and modulated stage 12. Provision of a modulated carrier for any purpose is an important feature of the present invention and will be discussed more in detail in connection with FIGURE 2 of the drawing. The accompanying sound or other audible program material appearing in the connection 14 is frequency modulated in the exciter 16 on a carrier provided by the exciter 16. The frequency modulated signal from the exciter 16 is mixed in the mixer 17 with a carrier from the frequency tripler 18 to provide the aural carrier for radiation having a frequency of 691.768 mc. which is 4.5 mc. higher than the visual carrier. This frequency separation between the radiated carriers facilitates demodulation of the frequency modulated sound signal at each television receiver. By operating the modulated stage 12 as a mixer, the plate circuit only, shown in more detail by FIGURE 2, needs to be broadbanded.

A common fixed frequency source 20 for mixers 12 and 17 can be used since there is no tube feed through of the unmodulated, driver carrier frequency $f_1$ to the output of the mixer and modulated stage 12. The fixed frequency source 20 may comprise a crystal oscillator and one or more doublers of any known type. The output frequency of the source 20 for the assumed radiated carrier frequencies will be 36.172 mc. This frequency is doubled and tripled twice by doubler 23, tripler 26 and the tripler 18. These three devices may be of any known type. The input $f_1$ to the mixer and modulated stage 12 will then be 651.096 mc. for the illustrative example.

A second input $f_2$ to the mixer and modulated stage 12 is obtained from the fixed frequency source 20 and amplified by the amplifier 28. Neither $f_1$ nor $f_2$ appear in the output 10 of the stage 12. Instead the sum of $f_1$ and $f_2$ is selected, namely, 651.096 mc. plus 36.172 mc. or 687.268 mc., which is the transposed carrier. This sum frequency is, as pointed out above, modulated by the video signal.

Referring to FIGURE 2, showing the mixer and modulated stage and its inputs more in detail, the driver carrier of frequency $f_1$, shown in FIGURE 1 as the output of the tripler 18, is coupled by way of a capacitor 31 to the cathode 33 of a triode 34. This triode 34 may, for example, be a ceramic pencil tube type 4055. This tube has a disk-like external connection, shown schematically at 36, for the grid 38. The external connection 41 for the anode 43 extends into and through the inner tubular conductor 45 of a waveguide cavity 47 having an outer enclosing tubular conductor 48. The connection 41 is coupled through but insulated from the tubular conductor 45 and is connected to a suitable positive biasing and operating potential source (not shown) for the tube 34. The waveguide cavity 47 is adjustably coupled to a companion waveguide cavity 51. The waveguide cavity 51 comprises an outer tubular conductor 53 and an inner tubular conductor 54. The waveguide cavities 47 and 51 are adjustably coupled as indicated schematically by the variable capacitor 59. These waveguide cavities may be cylindrical, for example.

The signal at the anode 43 includes both input frequencies as well as their combination products and appears as the field inside of the cavity 47. This signal is coupled to the inner conductor 45 of the waveguide cavity 47 by capacitive coupling between the anode 43 and anode lead 41 and the inner conductor 45. The grid 36 is capacitively coupled to the grounded outer conductor 48 by capacitance existing between the grid 36 and the grounded outer conductor 48 which are separated by a thin sheet of insulating material 60. The variable capacitor 59 adjustably couples the field existing in the cavity 47 to the interior of the cavity 51 by capacitively coupling the inner conductor 45 to the inner conductor 54. The grounded outer conductor 53 is also capacitively coupled to the grid 36 by the insulating material 60.

A grid blocking capacitor is provided by the thin sheet of insulating material 60 between the grid connection 36 and a grounded metallic member indicated schematically at 61. This may conveniently be the common grounded base member for the waveguide cavities 47 and 51 shown schematically at the left end of the waveguides as viewed in FIGURE 2.

Tuning of the waveguide cavity 47 is accomplished by a short circuiting member 62 having external means, indicated schematically at 63, for movement axially of the conductors 45 and 48. A corresponding arrangement for the waveguide cavity 51 is indicated at 65 and 66. Fine tuning of the cavity 47 is provided by a conductive member 71 movable toward or from the member 45. A corresponding member is indicated at 73.

The tube heater 78 is energized from a suitable current source (not shown), for example an A.C. source of commercial frequency by way of a resistor 81 and chokes 82 and 83. A capacitor 84 is bridged across the heater 78 and a variable capacitor 85 is connected from a circuit voltage reference point which may be chassis ground, for example, to the junction of the resistor 81 and the choke 82. The biasing and operating potential sources (neither shown) are returned for direct current to ground.

The previously mentioned coupling capacitance 31 may be the capacitance of the ouput connection of a cavity (not shown) associated with the plate of an amplifier or tripler tube (also not shown). The video modulating signal in series with a suitable negative bias for the grid 38 appears in a conductor 88. The latter is connected through a choke 89 to the external grid connection 36. A carrier having a frequency $f_2$ is fed into the primary 92 of a transformer 93. The secondary 94 is connected to ground and to the connection 36 by way of a variable capacitor 95. The circuit including the secondary 94, the capacitor 95 and the blocking capacitor provided in part by the thin sheet of insulating material 60 is a series resonant circuit tuned to the $f_2$ frequency. The modulated output carrier of frequency $f_c$, having any desired frequency, depending on the relationship of the input frequencies, is recovered from the tunable cavity assembly 51 by a conductive coupling member 99 and an output lead 101.

By way of example, the capacitors in FIGURE 2 of the drawing installed as separate components may have the following values:

| | Mmf. |
|---|---|
| Capacitor 84 | 390 |
| Capacitor 85 | 1.3 to 5.4 |
| Capacitor 95 | 8 to 50.0 |

By way of example, the resistor 81 may have a resistance of 1.2 ohms.

By way of example, the R.F. chokes may have the following values:

| | |
|---|---|
| Choke 82 | 0.1μ |
| Choke 83 | 0.1μ |
| Choke 89 | 0.1μ |

By way of example, 360 volts, positive with respect to ground, is present on the tube plate connection 41. The video signal in the connection 88 swings from 15 volts negative to 30 volts negative in a 15 volt peak-to-peak range.

By the arrangement of the invention, the tube 34 is operated in response to the driver frequency as a conventional grounded grid stage thereby deriving the stability and amplification normally achieved by such operation. By applying the transposing frequency signal along with the modulating signal to the control electrode or grid, the advantages gained by conventional grid modulation such as linearity of modulation without the need for excessive additional linear amplification are realized.

While a particular means for tuning and filtering is shown as a doubled tuned resonant cavity by way of example only, any suitable filtering means may be utilized.

I claim:

1. A modulation system for deriving a carrier signal of a desired carrier frequency amplitude modulated by a modulation signal from a driver frequency signal, a transposing frequency signal and said modulation signal wherein said transposing signal has a frequency substantially lower than said driver frequency and wherein said transposing signal has a frequency which when beat with said driver frequency signal transposes said driver frequency to said desired carrier frequency; said modulation system comprising:
  - a current control device having at least an input electrode, an output electrode, and a common electrode,
  - biasing means for providing biasing potentials to said electrodes to cause non-linear operation of said current control device,
  - first means coupled between said common electrode and a point of reference potential for applying said driver frequency as a first input to said current control device,
  - second means coupled between said input electrode and said point of reference potential for applying said modulation signal and said transposing frequency signal as a second and third input to said current control device, said second means having a significant impedance between said input electrode and said reference potential at said modulation signal frequency and said transposing frequency and having a negligible impedance therebetween at said driver frequency, and
  - third means coupled between said output electrode and said point of reference potential for applying said modulated desired carrier frequency signal as an output from said current control device.

2. The combination as claimed in claim 1, wherein said current control device is an electron tube having at least a grid forming said input electrode, an anode forming said output electrode, and a cathode forming said common electrode, respectively.

3. The combination as claimed in claim 2, wherein said second means includes a tuned circuit resonant at said transposing frequency.

4. The combination as claimed in claim 3 wherein said tuned circuit resonant as said transposing frequency includes a reactance coupled between said grid and said reference potential and having a negligible impedance at said driver frequency.

5. The combination as claimed in claim 4, wherein said third means includes a double tuned resonant cavity coupled between said anode and said point of reference potential for selecting said modulated desired carrier signal from the output of said current control device and for attenuating one sideband of said modulated carrier signal.

6. The combination as claimed in claim 1, wherein said first means includes a tuned circuit resonant at said driver frequency.

References Cited

UNITED STATES PATENTS

| | | | |
|---|---|---|---|
| 2,699,494 | 1/1955 | Albricht | 332—45 X |
| 3,002,161 | 9/1961 | Feryszka | 332—45 |
| 3,118,117 | 1/1964 | King et al. | 332—45 X |

ALFRED L. BRODY, *Primary Examiner.*

ROY LAKE, *Examiner.*